Aug. 31, 1926.
R. MALCOM
EYE PROTECTOR
Filed Oct. 23, 1922
1,598,537
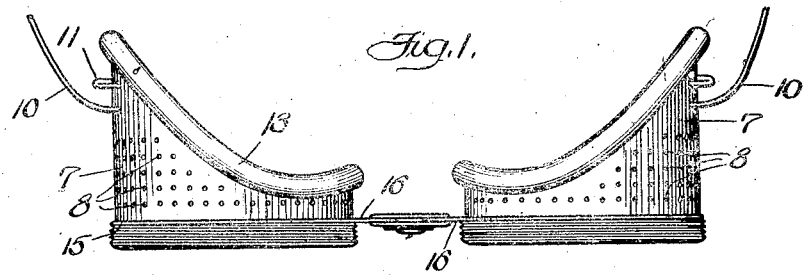
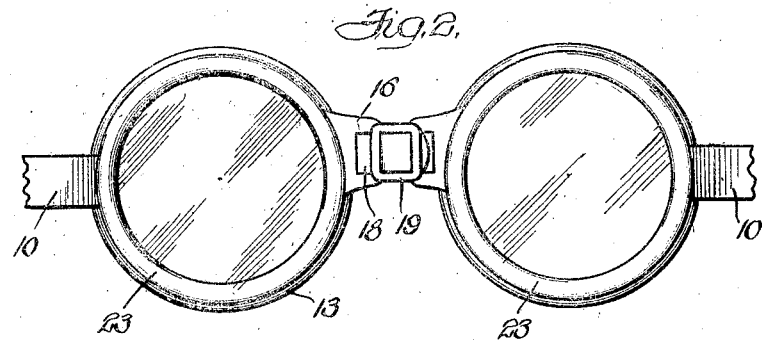
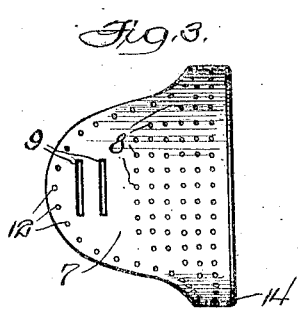
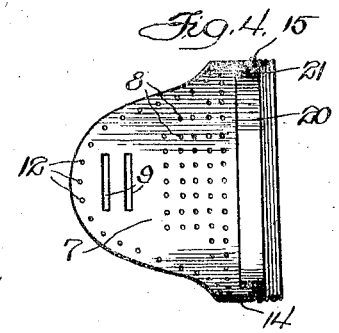
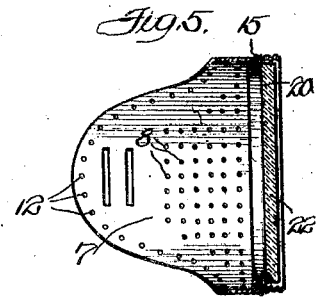
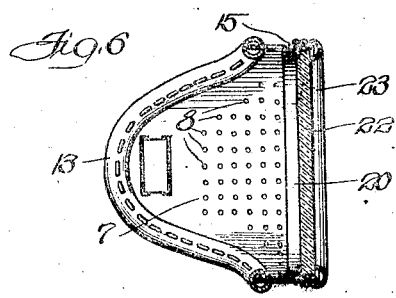
Witness:
Ub.K.Olson
Inventor:
Robert Malcom Patented Aug. 31, 1926.

1,598,537

UNITED STATES PATENT OFFICE.

ROBERT MALCOM, OF CHICAGO, ILLINOIS.

EYE PROTECTOR.

Application filed October 23, 1922. Serial No. 596,206.

My invention has for its object the production of an eye protector or goggle designed to be worn by workmen and others engaged in divers employments, where it is desirable to protect the eyes from dust, cinders, heat, bright lights, and the like.

It is also an object of my invention to provide a construction wherein the lens holding rims are attached to the eye cups and are so constructed that the lenses may be quickly and easily removed when desired.

A further object of my invention is to provide a movable connection or nose bridge between the eye cups and to provide means for supporting said nose bridge from the retaining ring which surounds each eye cup and presents projecting lugs through which said nose piece is secured.

A further object of my invention is to provide an eye protector comprising a pair of eye cups, each of which is elongated on a line diagonal to the axis thereof on one side to extend to the temples of the wearer, and to provide means for securing it on the head of the wearer which means is connected with the eye cups and secured thereto in such manner as to cause the pull upon the eye protector to draw from a point mediate the length of the elongated portion, thereby holding the eye cup in a position fitting closely to the features of the wearer and at the same time maintaining the lenses in proper position in front of the eyes of the wearer.

Other objects and advantages in the use of my construction will be apparent to those skilled in the art. In the accompanying drawings I have illustrated what I consider the preferred form of an embodiment of the essential features of my invention, and in these drawings Fig. 1 is a side elevation of my invention;

Fig. 2 is a front elevation of the same;

Fig. 3 is a sectional view taken through the center of the eye cup with the lens retaining rim detached;

Fig. 4 is a similar view of the eye cup with the lens holding ring and nose bridge ring shown in position for permanent attachment;

Fig. 5 is a view similar to Fig. 4 with the lens retaining ring bent into position for engagement with the circumferential shoulder on the eye cup and the lens in place within the ring.

Fig. 6 is a sectional view through the eye cup illustrating the eye cup with all of the parts in their relative positions.

Referring to the drawings, 7 illustrates an eye cup which is preferably stamped from any suitable material such as aluminum, and is provided with a plurality of small openings, 8, for the purpose of ventilation. Each of these eye cups is elongated on a line parallel with the axis theerof to provide a construction fitting closely to the temples of the wearer. Each eye cup is provided with a pair of elongated slots, 9, extending transversely of the elongated end through which the head band, 10, is attached by forming a hem or thickened portion on one end of said band, extending said band through a slot nearest the end of the elongated portion of the eye cup from the outside to the inside of said cup, then extending said band through the second slot from the inside to the outside of said cup, as shown; then passing the binding around the head of the wearer to engage the companion eye cup in the same manner. By this arrangement the backward pull of the head band from the eye protector is drawn from a point as near the center of the elongated portion of each eye cup as is found desirable whereby the eye protector is maintained close to the face of the wearer, the binding or rim of the eye protector being in contact with the face of the wearer at all times, thereby more effectively preventing entrance of dust or other foreign material.

Arranged around the outer edge of the eye cup is a row of small perforations, 12, for convenience in attaching the binding, 13, which in this instance, is formed of a split rubber tube which fits over the edge of the metal forming the eye cup body. This binding is secured to the body portion, 7, by stitching through the perforations, 12, as shown more clearly in Fig. 6.

Formed on the forward edge of each eye cup is an inwardly turned circumferential flange, 14. Seated on this flange is a ring, 15, corresponding in size to the opening of the eye cup.

Each of these rings, 15, is provided upon the periphery thereof with a projecting member, 16, each projecting member being positioned upon the short side of the eye cup, 7, and extends at right angles thereto to form a nose bridge for the eye protector when assembled. Each of the projecting members, 16, has a slot formed therein through which is passed a flexible connecting member, 18. The ends of the flexible member, 18, are secured together by means of a buckle or other fastening device, 19, as shown in Fig. 2. This connecting member may be adjusted to bring the projecting members, 16, closer together or extend them further apart to suit the requirements of the wearer.

The lens holding ring, 20, fits within the opening in the eye cup body and the ring, 15. The lens holding ring, 20, is constructed with a shoulder, 21, adapted to rest upon the ring, 15, and form a seat for the lens, 22. The outwardly extending portion of the periphery of said ring, 20, is threaded to receive the lens retaining member, 23. The retaining member, 23, is also threaded and has engagement with the threads upon the lens holding ring, 20. One edge of the retaining member, 23, is curved to extend over the edge of the threaded portion of the lens holding ring, 20, the edge thereof engaging the surface of the lens, 22, near the circumference thereof and as said retaining member is screwed upon the threaded ring, 20, the lens is securely held in place.

The inner edge of ring, 20, fitting inside of the flange, 14, is bent around and encloses edge of flange, 14, and the ring, 15, between said edge and the shoulder, 21, whereby said parts are all secured in proper relative positions. The retaining member, 23, may be removed from the lens holding ring at any time by turning the threaded member to unscrew the same whenever it is desirable to change the lenses, 22, for any purpose.

I claim:

1. An eye protector comprising a pair of eye cups each having one side thereof elongated on a line diagonal to its axis, a ring having an opening corresponding in size to the opening in the eye cup, each ring having a projecting lug positioned on the short side of the eye cup, a lens carrier adapted to secure said ring rigidly in position, on said cup and a lens on said lens carrier, a retaining member engaging said lens and a screw threaded connection between said carrier and retaining member.

2. An eye protector comprising a pair of eye cups each having one side thereof elongated on a line diagonal to its axis, a circumferential flange on the forward edge of each eye cup, a ring having an opening corresponding to the opening in each eye cup and positioned on said flange at the forward edge of each eye cup, a lens holding ring having means for engaging said ring and the aforesaid flange, a lens in each eye cup, and a removable retaining member engaging each of said lens holding rings to hold the lens in place.

3. An eye protector comprising a pair of eye cups each of which has a circumferential flange on the forward edge thereof, a ring seating on each of said flanges, said ring having a projection extending at right angles to the eye cup, a flexible connecting member engaging said projections and forming a nose bridge, a lens-holding ring fitting within the opening in each eye cup and having fixed engagement with the flange and ring, a lens in each of said holding rings, and a removable retaining member engaging each of the aforesaid holding rings and maintaining the lenses in position.

4. An eye protector comprising a pair of eye cups, an inwardly directed circumferential flange on the forward edge of each eye cup, a ring having an opening corresponding to the eye cup positioned against said flange, and a lens holding ring provided with a channel, said flange and said first mentioned ring being positioned within the said channel.

5. An eye protector comprising a pair of eye cups each having one side thereof elongated on a line diagonal to its axis, a ring for each eye cup having an opening therein in alignment with the opening in its respective eye cup, and having a projecting lug positioned on the short side of the eye cup, a circumferential flange formed on the forward edge of each eye cup against which its said ring is positioned, a lens holding ring arranged to hold each said first mentioned ring against its said flange and a flexible connecting member extending through slots in said lugs and with the lugs forming a nose piece.

In testimony whereof I have signed this specification.

ROBERT MALCOM.